(12) United States Patent
Dyal et al.

(10) Patent No.: US 7,350,829 B2
(45) Date of Patent: Apr. 1, 2008

(54) CONNECTION SYSTEM

(75) Inventors: Anthony S. Dyal, Sutton Coldfield (GB); Paul J. Mawhinney, Shrewsbury (GB)

(73) Assignee: Parker Hannifin plc, Bridgetown, Cannock Staffs (GB)

( * ) Notice: Subject to any disclaimer, the term of this patent is extended or adjusted under 35 U.S.C. 154(b) by 196 days.

(21) Appl. No.: 10/968,477

(22) Filed: Oct. 19, 2004

(65) Prior Publication Data

US 2005/0077724 A1 Apr. 14, 2005

Related U.S. Application Data

(63) Continuation of application No. PCT/GB03/01691, filed on Apr. 16, 2003.

(30) Foreign Application Priority Data

Apr. 25, 2002 (GB) ................. 0209440.7

(51) Int. Cl.
*F16L 37/26* (2006.01)
(52) U.S. Cl. ............... 285/325; 285/406; 403/331
(58) Field of Classification Search ............ 285/325, 285/326, 327, 19, 124.5, 406; 403/294, 331, 403/381
See application file for complete search history.

(56) References Cited

U.S. PATENT DOCUMENTS

| | | | |
|---|---|---|---|
| 218,723 A | | 8/1879 | Faust |
| 959,854 A | | 5/1910 | Grierson |
| 2,752,215 A | * | 6/1956 | Peiss ................ 312/111 |
| 3,934,605 A | * | 1/1976 | Legris ............... 137/271 |
| 4,070,045 A | | 1/1978 | Colter et al. |
| 4,082,324 A | * | 4/1978 | Obrecht ............. 285/124.5 |
| 4,289,335 A | * | 9/1981 | Olbermann ............ 285/91 |
| 4,533,020 A | * | 8/1985 | Yamazaki ............ 184/55.2 |
| 4,580,817 A | * | 4/1986 | Bonino et al. ........... 285/325 |
| 5,217,260 A | * | 6/1993 | Boticki ................ 285/12 |
| 5,244,300 A | * | 9/1993 | Perreira et al. .......... 403/381 |
| 5,383,689 A | | 1/1995 | Wolfe, Sr. |
| 5,666,713 A | * | 9/1997 | Kubota ............... 29/525.01 |
| 5,813,791 A | * | 9/1998 | Kubota ............... 403/294 |
| 6,039,358 A | | 3/2000 | Stoll et al. |
| 6,733,044 B2 | * | 5/2004 | Huang ............... 285/124.1 |
| 6,892,763 B2 | * | 5/2005 | Burkhardt et al. ........ 137/884 |

FOREIGN PATENT DOCUMENTS

| | | |
|---|---|---|
| DE | 26 00 508 | 7/1977 |
| FR | 2 257 846 | 8/1975 |

\* cited by examiner

*Primary Examiner*—James M. Hewitt
(74) *Attorney, Agent, or Firm*—Christopher H. Hunter

(57) ABSTRACT

A connection system comprising first and second fluid-conducting components, each of which includes a connection face with a fluid port and at least one slot arrangement comprising first and second substantially parallel slots. The slots each include an aperture and first and second tapered surfaces. The system further includes a connector comprising a coupling element with a support and first and second coupling members which extend in substantially parallel relation therefrom, and a slide element moveable between a first, unlocked position in which the connector is movable relative to the fluid-conducting components and a second, locked position in which the slide element engages the fluid-conducting components. The coupling members each include first and second tapered cam surfaces, and first and second cam surfaces.

31 Claims, 17 Drawing Sheets

CONNECTION SYSTEM

CROSS REFERENCE TO RELATED APPLICATIONS

This application is a continuation of co-pending International Application No. PCT/GB03/001691, filed Apr. 16, 2003, which designated the United States and is incorporated herein by reference; and claims priority to Great Britain Patent Application 0209440.7, filed Apr. 25, 2002.

BACKGROUND OF THE INVENTION

The present invention relates to a connection system for interconnecting fluid-conducting components, in particular pneumatic components.

Connection systems currently exist for interconnecting fluid-conducting components. These connection systems, however, incorporate elements, such as locking screws, which extend externally of the fluid-conducting components in locking the components together and preventing movement of the components about the usual six degrees of freedom (x, y and z and rotation about those axes). As such, the effective external dimension of the coupled components is significantly greater than the dimension of the components per se.

SUMMARY OF THE INVENTION

It is an aim of the present invention to provide an improved connection system for interconnecting fluid-conducting components, in particular pneumatic components.

Accordingly, the present invention provides a connection system comprising first and second fluid-conducting components and a connector, each of the first and second fluid-conducting components comprising a slot arrangement comprising first and second substantially parallel slots extending across a connection face of the fluid-conducting component from an edge of the connection face, each of the first and second slots having a first tapered surface and a second tapered surface, the connector comprising a coupling element having first and second coupling members, each of the coupling members having a first tapered surface and a second tapered surface, wherein, in use, the connector engages with the slot arrangement such that the first tapered surface of the first and second slots engages with the first tapered surface of the respective first and second Coupling members to draw the first and second fluid-conducting components together, and the second tapered surface of the first and second slots engages with the second tapered surface of the respective first and second coupling members to align the first fluid-conducting component relative to the second fluid-conducting component.

A connection system according to the present invention, wherein the connection faces of the fluid-conducting components are substantially planar. Suitably, the connection face comprises a fluid port.

Suitably, the slot arrangement comprises elongate slots. The first and second slots suitably define first and second channels in the fluid-conducting components.

The first tapered surface of the first and second slots may comprises one or both walls of the respective first or second channel, which one or both walls are substantially parallel to the connection face of the fluid-conducting component.

The first tapered surface of the first and second slots suitably tapers inwards along the length of the slot, away from the connection face, such that the width of the channel provided by the slot decreases from the edge of the connection face towards the distal end of the slot.

The second tapered surface of the first and second slots may comprise one or both of the edges defining the respective first or second slot. Suitably, the one or both edges taper inwardly such that the height of the slot decreases from the edge of the connection face towards the distal end thereof.

The first tapered surface of the first and second slots may taper at any suitable angle with respect to the connection face. The first tapered surface of the first and second slots may taper at an angle of between 0-90°, preferably, between 0.5-45° and more preferably between 1-10°. Advantageously, the first tapered surface of the slots tapers at an angle of about 2°. The first tapered surface of the first slot may taper at the same angle as the first tapered surface of the second slot. Alternatively, the first tapered surface of the first slot may taper at a different angle to the first tapered surface of the second slot.

The second tapered surface of the first and second slots may taper at any suitable angle with respect to the central longitudinal axis of the respective slot. The second tapered surface of the first and second slots may taper at an angle of between 0-90°, preferably between 0.5-45° and more preferably between 1-10°. Advantageously, the second tapered surface of the first and second slots tapers at an angle of about 2 degrees. The second tapered surface of the first slot may taper at the same angle as the second tapered surface of the second slot. Alternatively, the second tapered surface of the first slot may taper. at a different angle to the second tapered surface of the second slot.

The coupling element of the connector suitably comprises a support from which the first and second coupling members extend. Suitably, the first and second coupling members extend substantially perpendicular of a first side of the support and are spaced from one another on the support. Preferably, the first and second coupling members are located at opposite ends of the support.

Suitably, the coupling members have a substantially U-shaped cross-sectional shape, each comprising first and second side walls joined by a bridging wall.

The coupling members are suitably arranged on the support such that longitudinal edges of the side walls of the first coupling member face longitudinal edges of the side walls of the second coupling member.

The first tapered surface of the first and second coupling members is suitably provided by an inner surface of one or both side walls of the coupling member, wherein the thickness of the side wall decreases from the support to the distal end of the side wall.

The second tapered wall of the first and second coupling members is suitably provided by longitudinal edges of the side walls of the first and second coupling members, wherein the longitudinal edges of the side walls, diverge outwards from the support such that the depth of the side wall decreases from the support to the distal end of the side wall.

The connector may further comprise a slide element, which is slideably disposed relative to the coupling element for movement between an unlocked position and a locked position.

The support of the connector may comprise a base section, a flange which is spaced from and extends longitudinally along the outer surface of the base section, and a rib which extends longitudinally along the base section. The rib is suitably of smaller width than the flange section. The rib suitably connects the flange section and the base section. The rib suitably comprises an enlarged section at one end thereof, which acts, in use, to prevent improper fitting of the support and the slide element. The rib may further include lateral projections arranged to act, in use, as a detent.

The slide element may comprise a body section and a lateral projection. The body section may comprise an elongate section. The body section suitably comprises a through slot and a recess. The recess is suitably arranged to receive the flange section of the support member in use. The through slot is suitably arranged to receive the rib of the support member, in use. The through slot suitably includes a cut-out, preferably a pair of cut outs in opposed sides thereof. The cut-outs are suitably arranged to engage the lateral projections of the rib of the support to lock the slide element, in use. With this configuration, the slide element is captively slideably disposed to the coupling element between a first, extended position and a second, retracted position. In the extended position, the projection on the locking slide element is suitably extended to allow for complete insertion of the connector in a slot.

The coupling element of the connector may comprise any suitable material, preferably metal. The slide element of the connector may comprise any suitably material, preferably a plastics material.

One or both of the first and second fluid-conducting components may comprise a lug which is engaged in use by the slide member of the connector. Suitably, when the slide member engages with the lug, the slide member is in the locked position.

The fluid-conducting components may each include a recess at the edge thereof in which the support member of the coupling element is locatable. Suitably, the recess extends along part or substantially the whole of the edge of the connection face from which the first or second slot extends. The fluid-conducting components may comprise first and second recesses, which first and second recesses suitably extend along opposing edges of the connection face.

The lateral projection of the slide element of the connector is suitably arranged such that, in use, it may be engaged with a lug of a fluid connecting component. In the retracted position, the projection of the slide element suitably engages a lug of the fluid-conducting component such as to lock the coupling element in position.

Suitably, the first and second slots extend inwardly from a recess. If the fluid conducting components comprise a first and second recess, then the fluid conducting suitably comprises first and second slot arrangements. In this case, the first and second slot arrangements suitably extend in opposing relation from respective ones of the first and second recesses.

Suitably, a lug is located at each end of the recess. Suitably, the lug is directed outwardly in a direction substantially orthogonal to the principal axes of the slot. Preferably, each of the connection faces of the fluid-conducting components include a lug which is engaged by the slide element of the connector when in the locked position.

Suitably, the coupling members are spaced apart such as to be engageable, in use, in the slots of the slot arrangements of the fluid connecting component.

Suitably, the connection system comprises seal means about the fluid port in the fluid-conducting component. Any suitable seal means may be used. Preferably, the seal means comprises a counterbore in the connection face extending around the fluid port. An O-ring seal, for example, may be located in the counterbore. Preferably, a tube of elastomeric material, such as rubber or a synthetic equivalent, is located in the couterbore of one of the first and second fluid-conducting components.

In use of the connector system according to the present invention, in a first step a connector is inserted in the slot arrangement of first and second adjacent fluid-conducting components. The insertion of the coupling members of the coupling element of the connector into the slots, causes the first tapered surface of the coupling members to act on the respective first tapered surface of the slots and thereby draw the connection faces of the fluid-conducting components together in alignment and provide a fluid tight seal between the fluid ports therein.

At the same time, the insertion of the coupling members of the connector in the slots causes the second tapered surfaces of the coupling members to act on the second tapered surfaces of the slots and thereby align the fluid-conducting components.

In a second step, the connector is locked in position by sliding the slide element to the locked position, in which position the projection on the slide element engages a lug on the connection face of the fluid-conducting component and prevents movement of the connector from the slot arrangement. In this locked position, the lateral projection on the rib of the support of the coupling element engages the cut-out in the through slot of the slide element so as to maintain the slide element in the locked position.

When in use in a hydraulic system, gas passing through the fluid-conducting component inflates the elastomeric tube of the seal, which expands into the counterbore of the adjoining fluid-conducting component, thereby providing a fluid tight seal.

Preferred embodiments of the present invention will now be described hereinbelow by way of example only with reference to the accompanying diagrammatic drawings.

DETAILED DESCRIPTION OF THE PREFERRED EMBODIMENT

Figure 1:
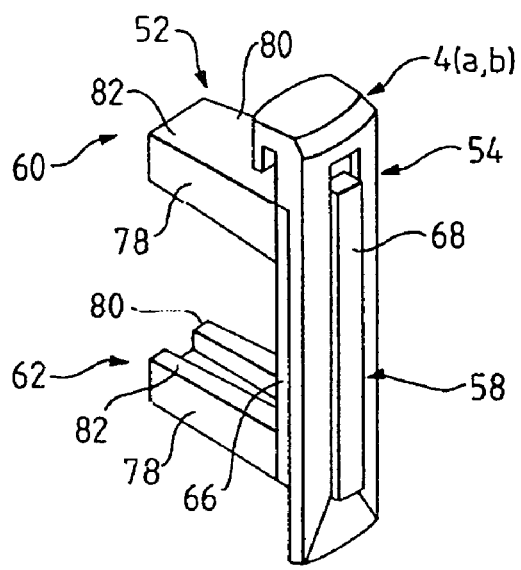
FIG. 1 illustrates a perspective view of a connector in accordance with a first embodiment of the present invention.
Figure 2:
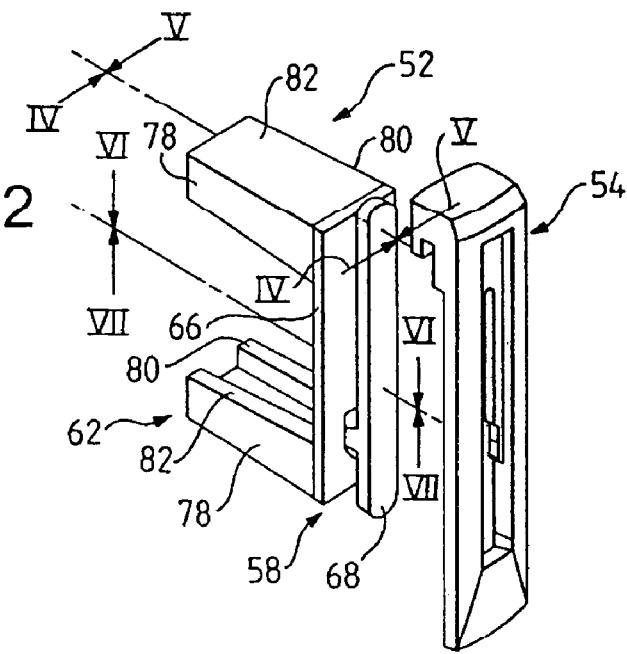
FIG. 2 illustrates an exploded perspective view from above, one side and one end of the connector of FIG. 1.
Figure 3:
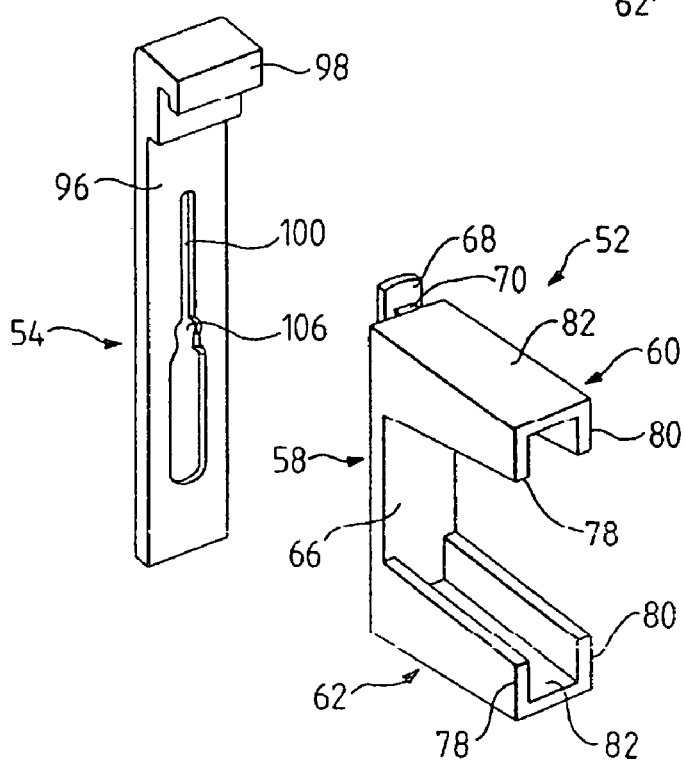
FIG. 3 illustrates an exploded perspective view from above, the other side and the other end of the connector of FIG. 1.
Figure 4A:
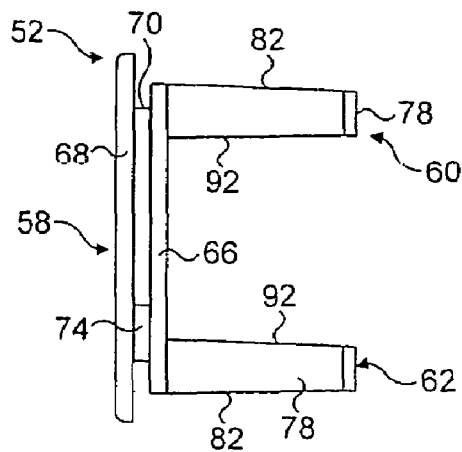
FIG. 4(a) illustrates a side view of the coupling element of the connector of FIG. 1.
Figure 4B:
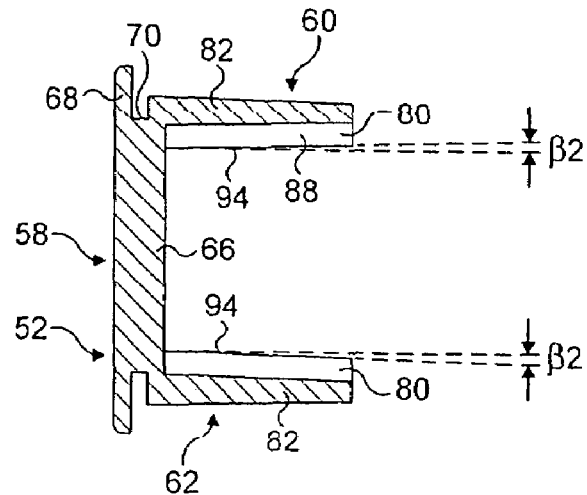
FIG. 4(b) illustrates a vertical sectional view (along section IV-IV in FIG. 2) of the coupling element of FIG. 4(a)
Figure 4C:
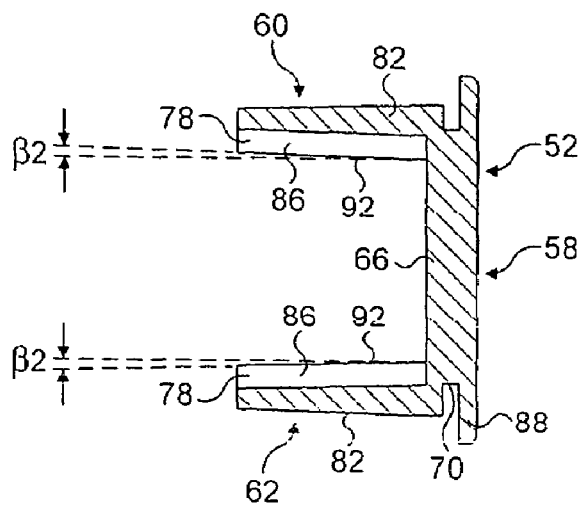
FIG. 4(c) illustrates a vertical sectional view (along section V-V in FIG. 2) of the coupling element of FIG. 4(a)
Figure 4D:
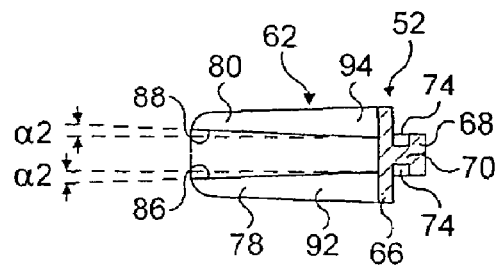
FIG. 4(d) illustrates a horizontal sectional view (along section VI-VI in FIG. 2) of the coupling element of FIG. 4(a)
Figure 4E:
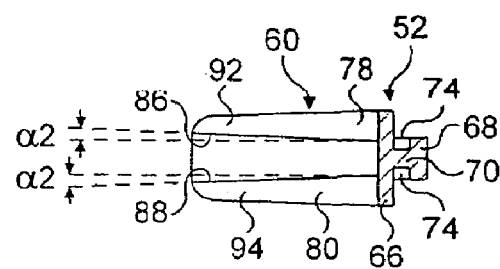
FIG. 4(e) illustrates a horizontal sectional view (along section VII-VII in FIG. 2) of the coupling element of FIG. 4(a)
Figure 5A:
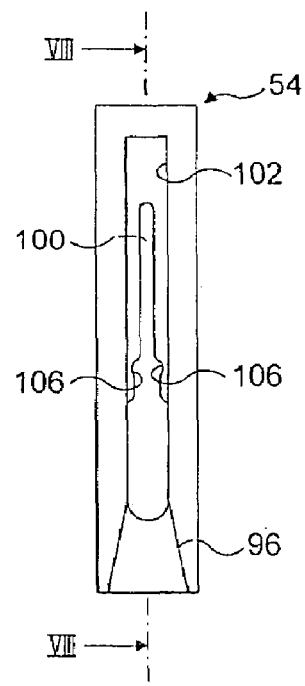
FIG. 5(a) illustrates an end face view of the locking slide element of the connector of FIG. 1.
Figure 5B:
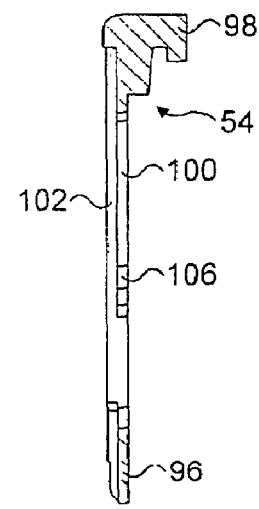
FIG. 5(b) illustrates a vertical sectional view (along section VIII-VIII in FIG. 5(a)) of the locking slide element of FIG. 5(a)
Figure 6A:
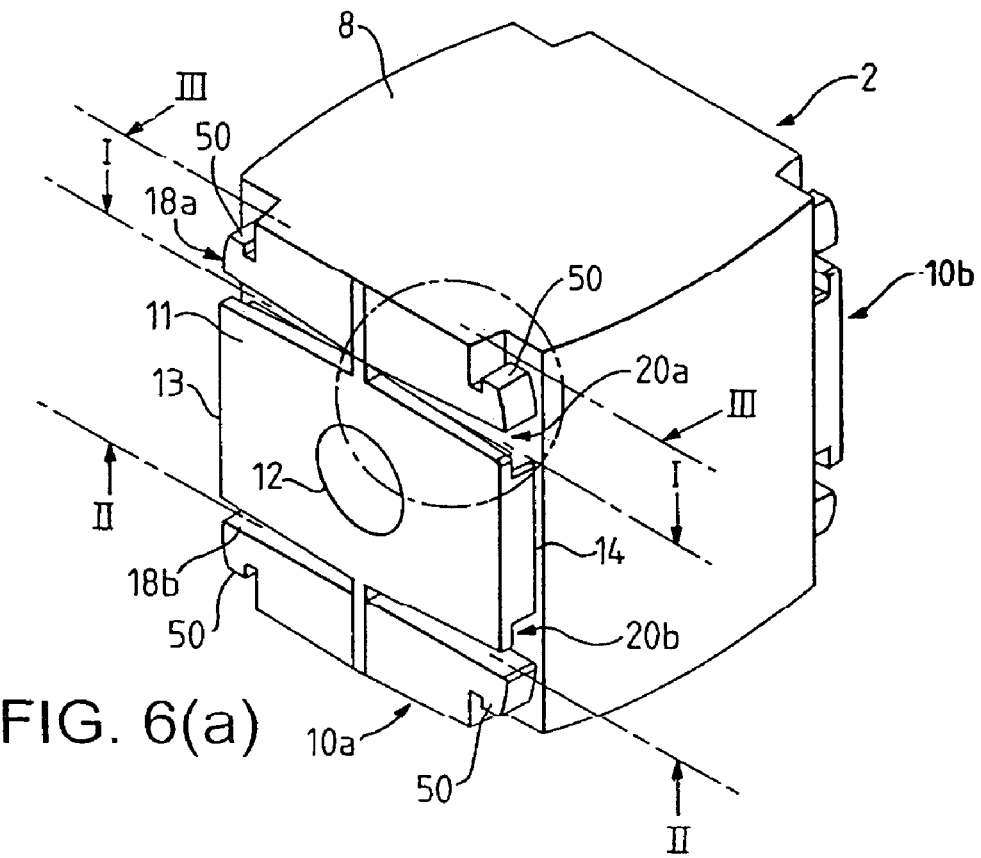
FIG. 6(a), illustrates a perspective view of a fluid-conducting component in accordance with a first embodiment of the present invention.
Figure 6B:
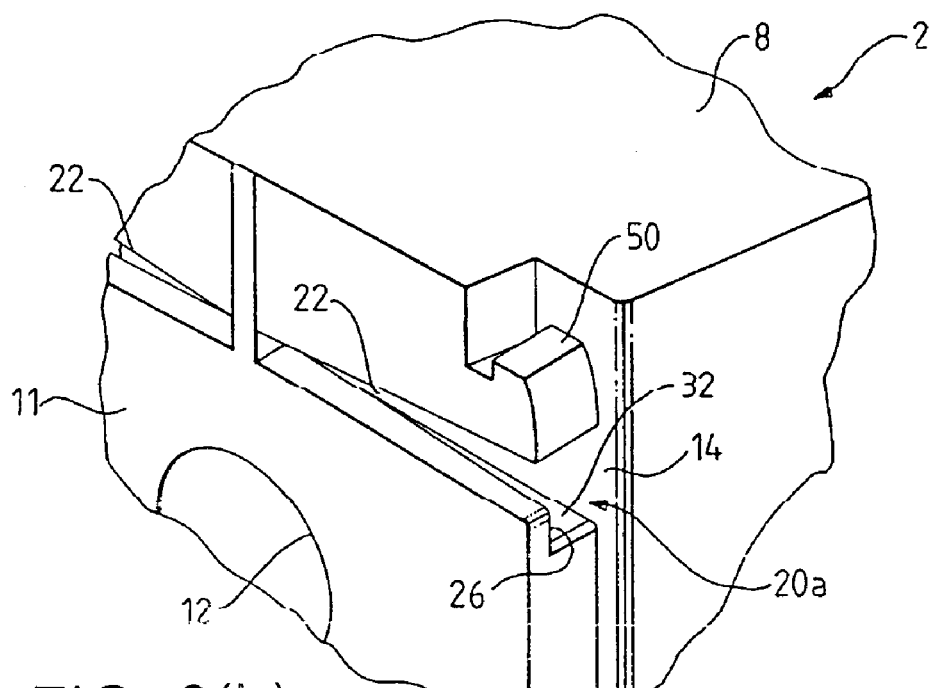
FIG. 6(b) illustrates in enlarged scale a fragmentary perspective view of one end face connection of the fluid-conducting component of FIG. 6(a)
Figure 6C:
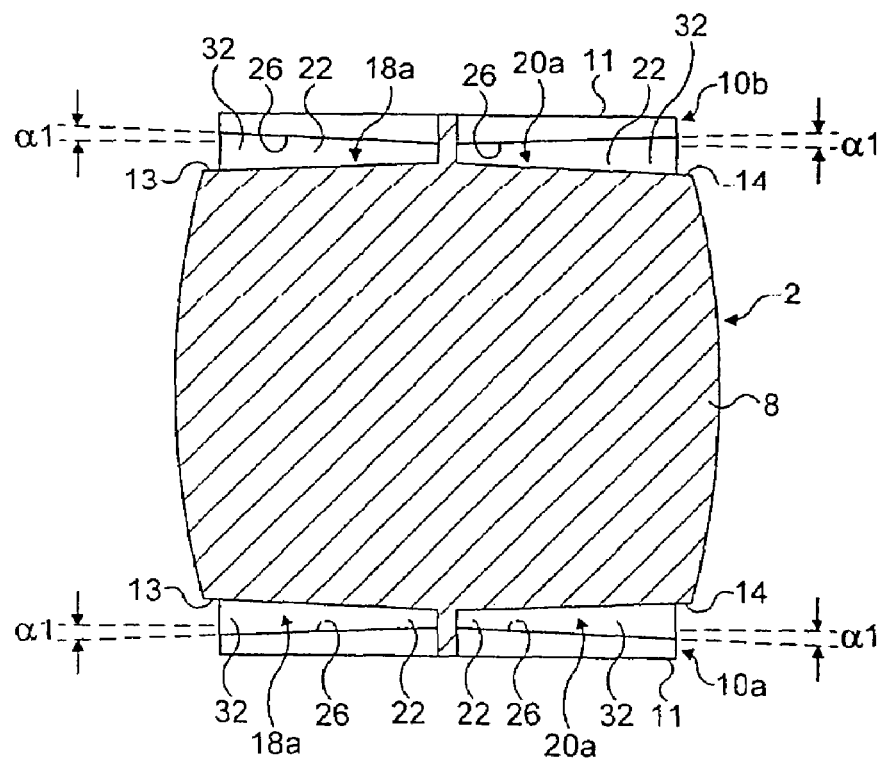
FIG. 6(c) illustrates a horizontal sectional view (along section I-I in FIG. 6(a)) of the fluid-conducting component of FIG. 6(a)
Figure 6D:
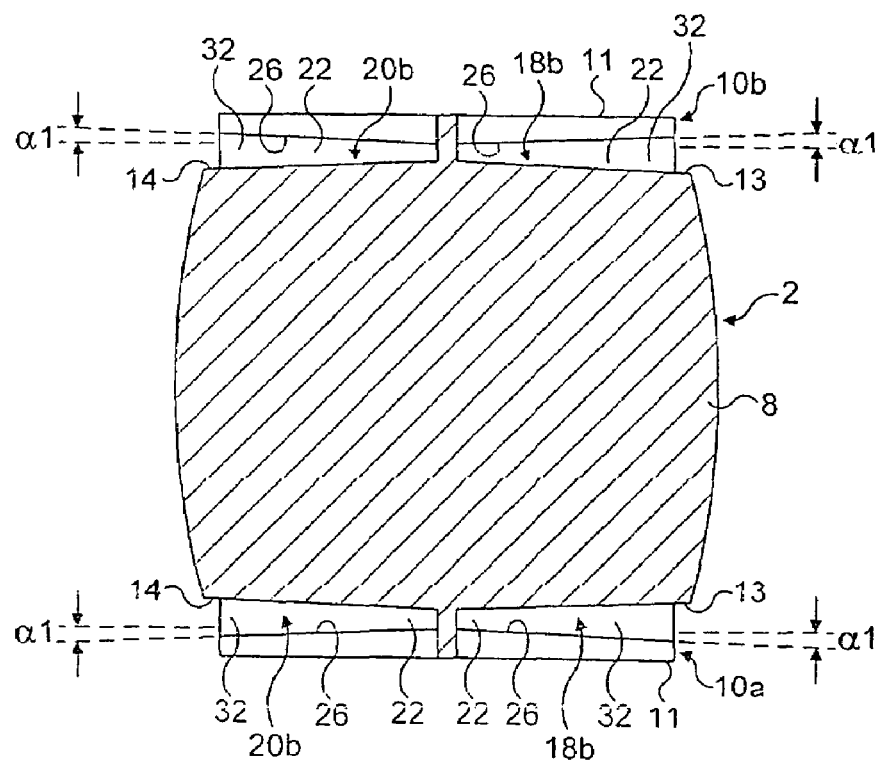
FIG. 6(d) illustrates a horizontal sectional view (along section II-II in FIG. 6(a)) of the fluid-conducting component of FIG. 6(a)
Figure 6E:
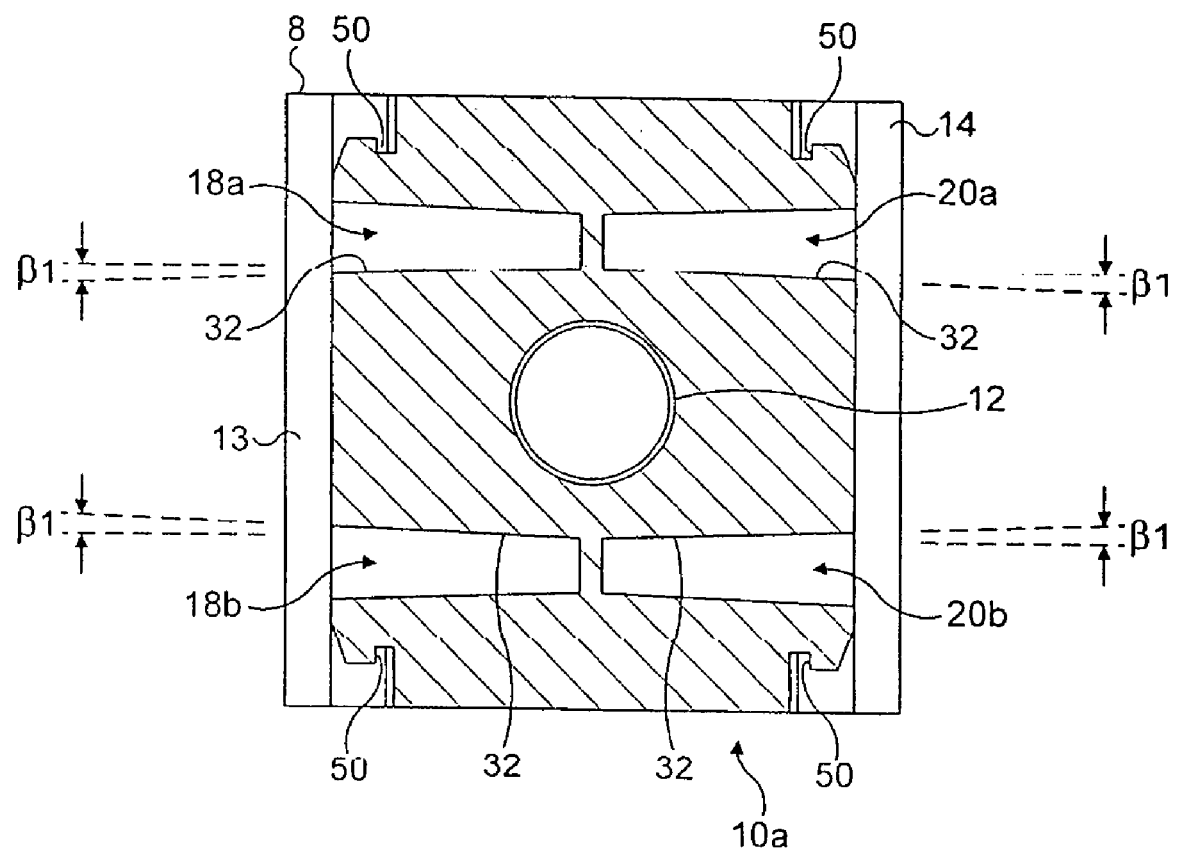
FIG. 6(e) illustrates a vertical sectional view (along section III-III in FIG. 6(a)) of the fluid-conducting component of FIG. 6(a)

The connection system of FIGS. 1-10 comprises a plurality of fluid-conducting components 2 and a plurality of connectors 4 for interconnecting the fluid-conducting components 2. In this embodiment adjacent fluid-conducting components 2 are interconnected by first and second connectors 4a; 4b.

Each fluid-conducting component 2 comprises a.main body 8 and at least one connection face 10, in this embodiment first and second connection faces 10a, 10b at opposed ends thereof, which connection faces 10a, 10b are connected to the connection faces 10a, 10b of other fluid-conducting component 2 by first and second connectors 4a, 4b.

The first and second connection faces 10a, 10b each include a substantially planar connection surface 11, which surface 11 includes a fluid port 12 in fluid communication with an internal fluid conduit, and first and second recesses 13, 14 which, in this embodiment, extend along opposed sides of the main body 8, in which recesses 13, 14 parts of the first and second connectors 4a, 4b are housed as will be described in more detail hereinbelow.

The first and second connection faces 10a, 10b each further include first and second slot arrangements 18, 20, in this embodiment each comprising first and second elongate, parallel slots 18a, 18b, 20a, 20b which extend in opposed relation inwardly from respective ones of the first and second recesses 13, 14.

The slots 18a, 18b, 20a, 20b of the slot arrangements 18, 20 each include an elongate aperture 22 in the respective connection surface 11, in which apertures 22 a part of a respective one of the connectors 4a, 4b is insertable as will be described in further detail hereinbelow. The slots 18a, 18b, 20a, 20b each further include a first cam surface 26, in this embodiment an inwardly-facing side surface facing oppositely from the respective connection surface 11, which tapers inwardly from the respective recess 13, 14 in a direction away from the respective connection surface 11, in this embodiment at an angle α of about 2°, with respect to the axis of insertion of the respective connector 4a, 4b. The slots 18a, 18b, 20a, 20b each further include an second cam surface 32, in this embodiment an outwardly-facing base surface, which tapers outwardly from the respective recess 13, 14, in this embodiment at an angle β of about 2°, with respect to the axis of insertion of the respective connector 4a, 4b.

The first and second connection faces 10a, 10b each further include a lug 50 at each of the ends of the recesses 13, 14, which lugs 50 are directed outwardly in directions substantially orthogonal to the principal axes of the slots 18a, 18b, 20a, 20b.

The connectors 4a, 4b each comprise a coupling element 52, in this embodiment a metal component, which is engageable in one of the slot arrangements 18, 20, and a locking slide element 54, in this embodiment a plastics component, which is slideably disposed to the coupling element 52 to lock the same in position when inserted in one of the slot arrangements 18, 20.

The coupling element 52 comprises a support 58 and first and second coupling members 60, 62 which extend in parallel relation from the support 58 with such a spacing as to be engageable in the slots 18a, 18b, 20a, 20b of respective ones of the slot arrangements 18, 20 of the fluid-conducting components 2 to be interconnected.

The support 58 comprises a base section 66, a flange section 68 which is spaced from and extends longitudinally along the outer surface of the base section 66, and a rib 70 which is of a smaller width than the flange section 68 and connects the base section 66 and the flange section 68. The rib 70 includes an enlarged section 72 at one end thereof which acts to prevent the improper fitting of the coupling element 52 and the locking slide element 54. The rib 70 further includes lateral projections 74 which act as a detent as will be described in further detail hereinbelow.

The first and second coupling members 60, 62 each comprise first and second, flange sections 78, 80 which extend in spaced and parallel relation from the base section 66 of the support 58, and a third, web section 82 which interconnects the flange sections 78, 80.

The flange sections 78, 80 each include a first, cam surface 86, 88, in this embodiment an inwardly-facing side surface, which is configured to engage the inwardly-facing, first cam surface 26 of the respective one of the slots 18a, 18b, 20a, 20b of the slot arrangements 18, 20 in the fluid-conducting components 2 to be interconnected. The first cam surfaces 86, 88 of the flange sections 78, 80 are each tapered outwardly, in this embodiment at an angle $\alpha_2$ of about 2°, from the base section 66 of the support 58.

The flange sections 78, 80 each further include a second, cam surface 92, 94, in this embodiment an inwardly-facing edge surface, which is configured to engage the outwardly-facing second cam surface 32 of the respective one of the slots 18a, 18b, 20a, 20b of the slot arrangements 18, 20 of the fluid-conducting components 2, 2 to be interconnected. The edge cam surfaces 92, 94 of the flange sections 78, 80 are each tapered outwardly, in this embodiment at an angle $\beta_2$ of about 2°, from the base section 66 of the support 58.

Figure 7:
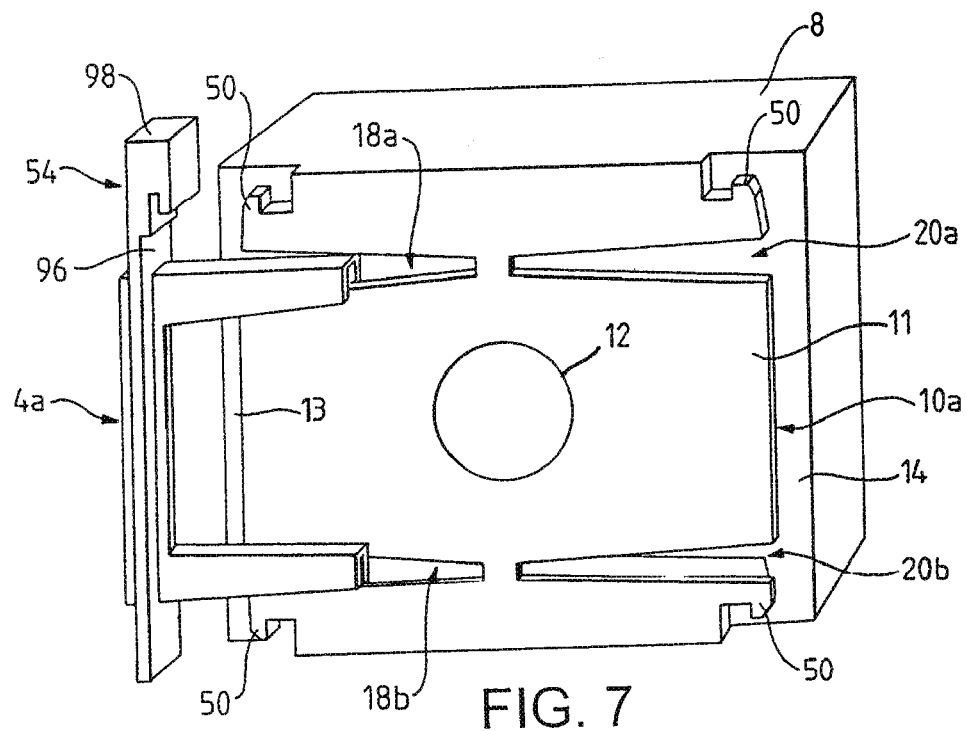
FIG. 7 illustrates an end view of one connector of FIG. 1 partially fitted to a first fluid-conducting component of FIG. 6(a)
Figure 8:
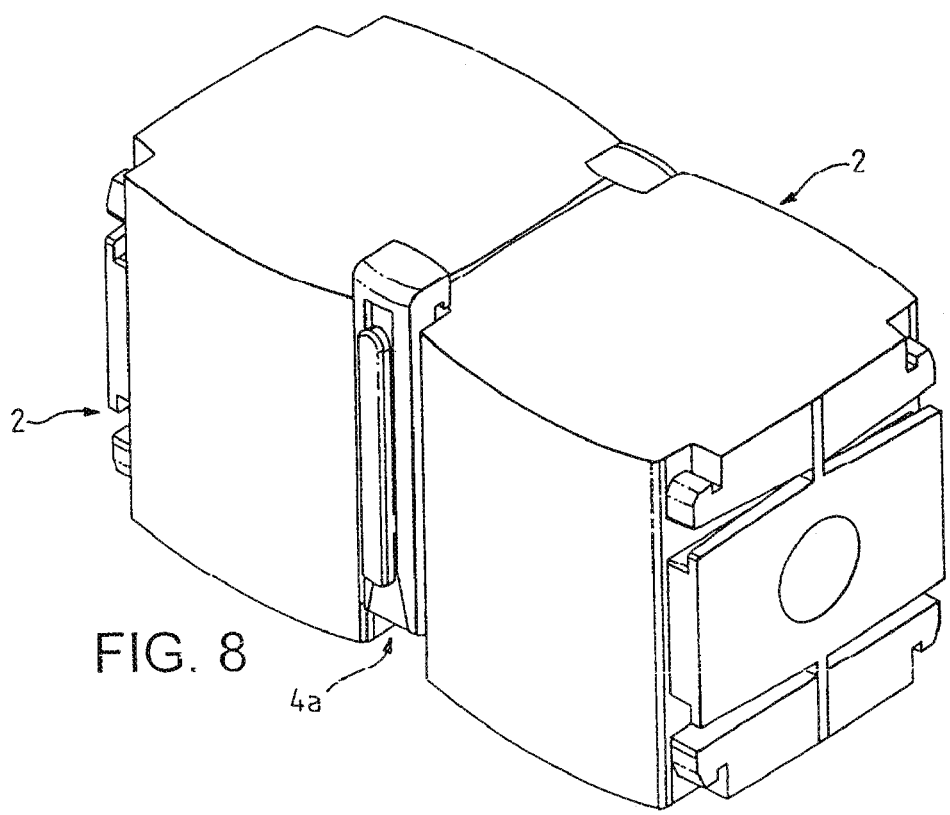
FIG. 8 illustrates a perspective view of a first connector of FIG. 1 interconnecting the first fluid-conducting component of FIG. 6(a) and a second fluid-conducting component of FIG. 6(a), with the locking slide element of the first connector in the raised, unlocked position.
Figure 9:
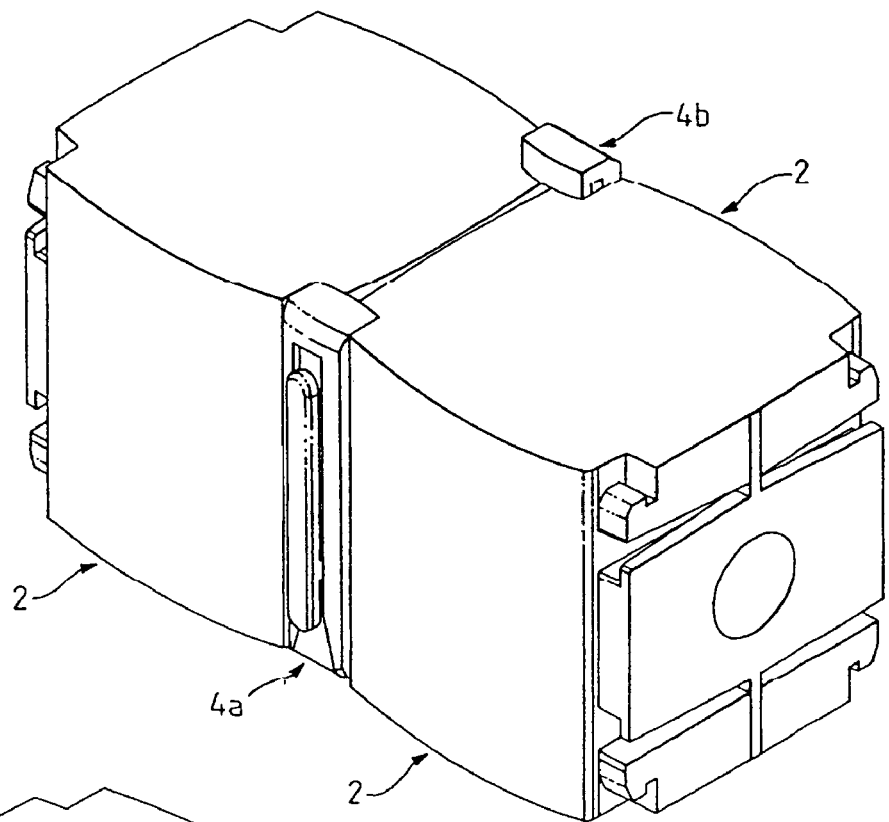
FIG. 9 illustrates a perspective view of the first connector and a second connector, both according to FIG. 1, interconnecting the first and second fluid-conducting components, both according to FIG. 6 (a), with the locking slide element of the first connector in the lowered, locking position and the locking slide element of the second connector in the raised, unlocked position.
Figure 10:
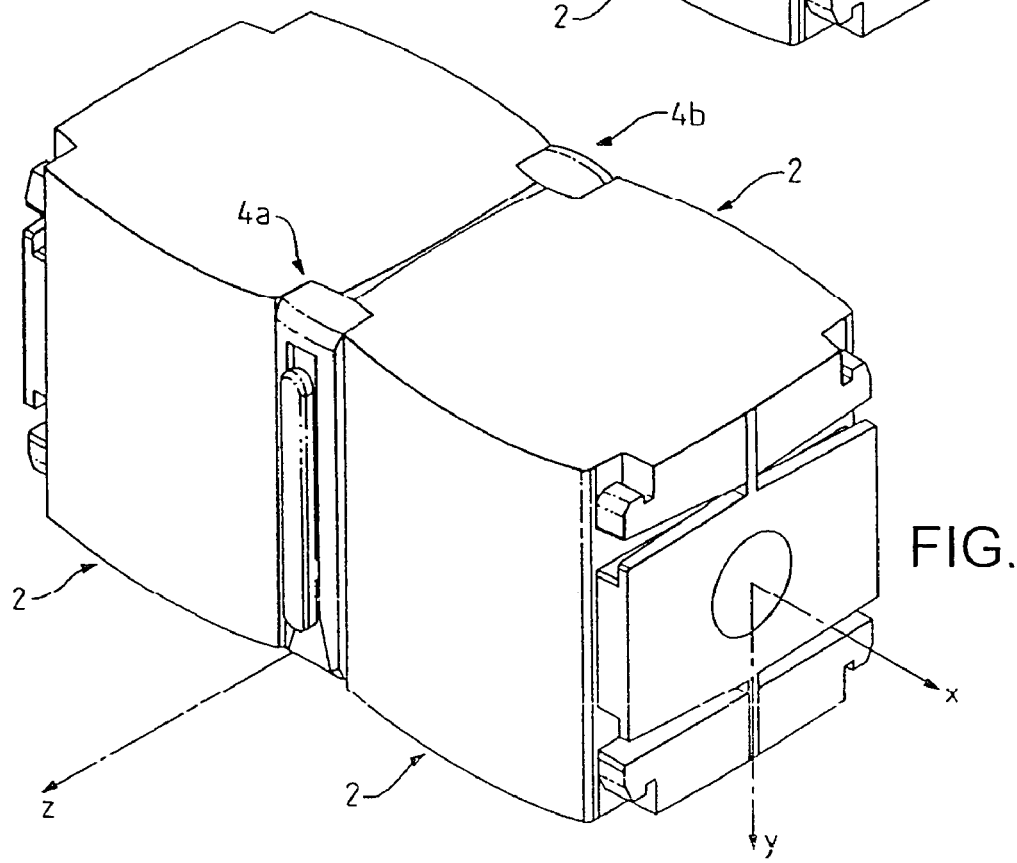
FIG. 10 illustrates a perspective view of the first and second connectors interconnecting the first and second fluid-conducting components of FIG. 9, with the locking slide elements of the first and second connectors in the lowered, locking positions.
Figure 11A:
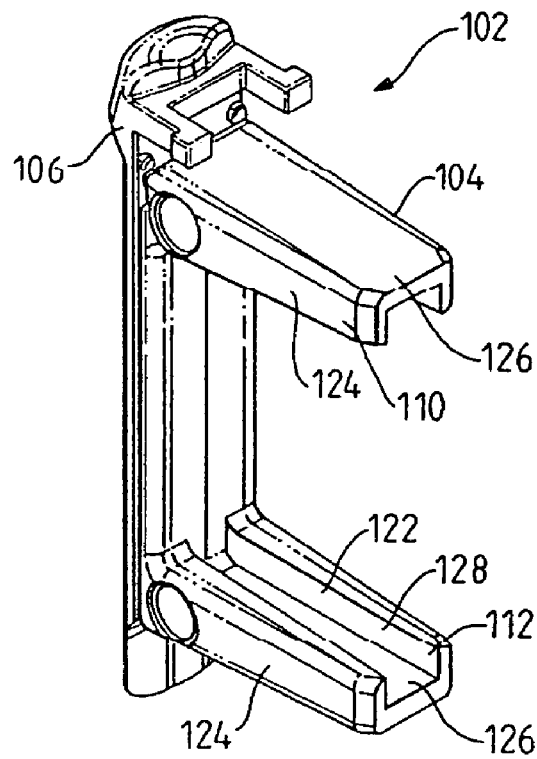
FIG. 11(a) illustrates a front perspective view of a connector in accordance with a second embodiment of the present invention.
Figure 11B:
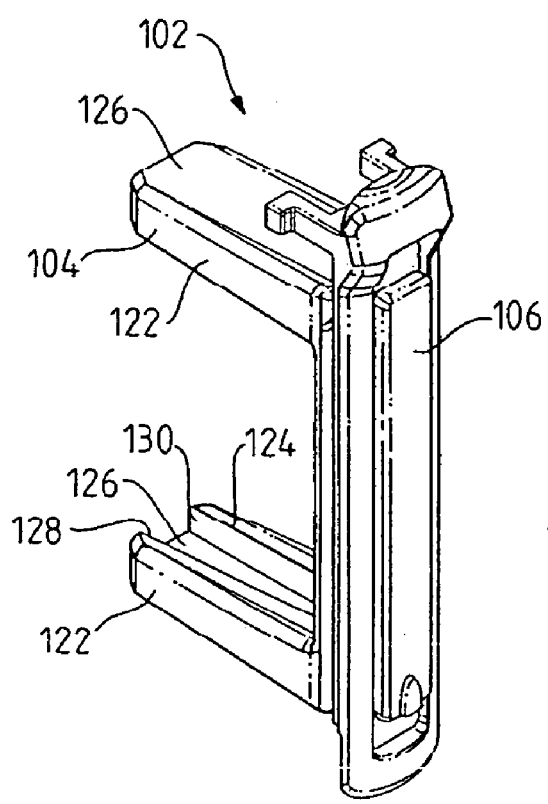
FIG. 11(b) illustrates a rear perspective view of the connector of FIG. 11(a)
Figure 12A:
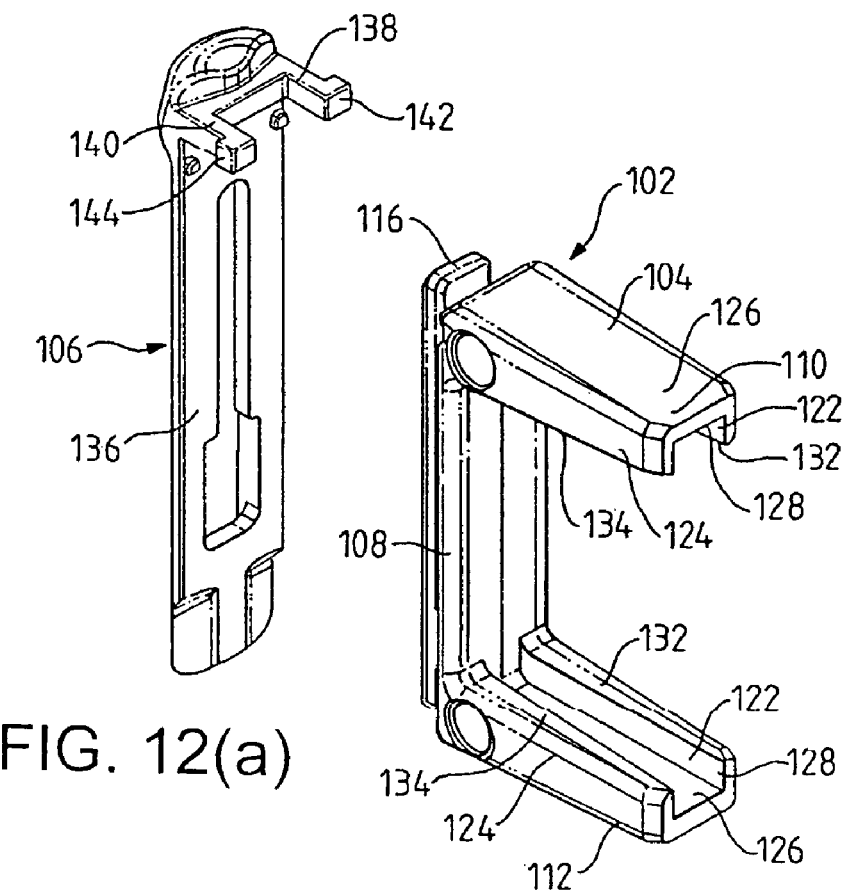
FIG. 12 (a) illustrates an exploded view of the connector of FIG. 11(a)
FIG. 12(b) illustrates an exploded view of the connector of FIG. 11(b)
Figure 12B:
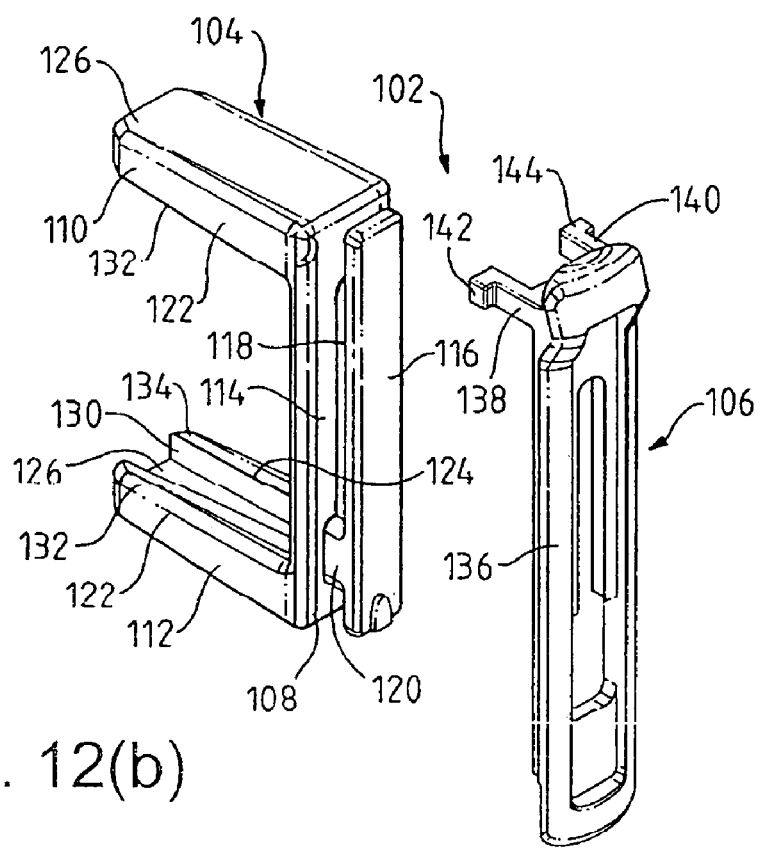
Figure 13A:
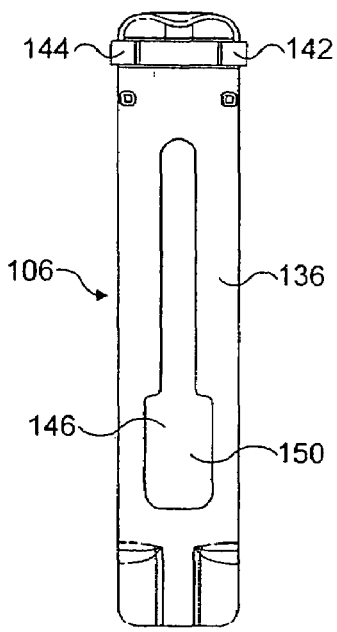
FIG. 13(a) illustrates a front view of the locking slide element of the connector of FIG. 11(a)
Figure 13B:
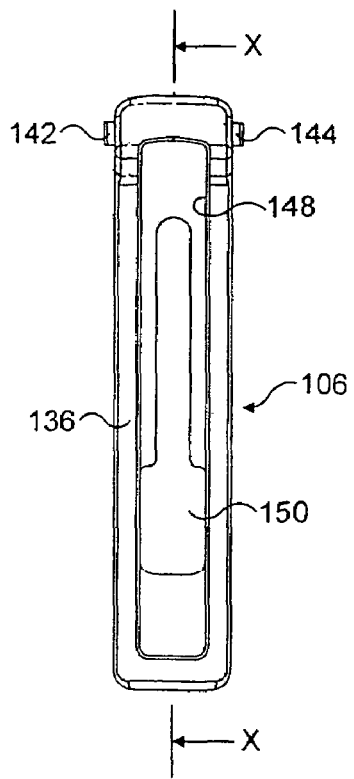
FIG. 13(b) illustrates a rear view of the locking slide element of the connector of FIG. 11(a);.
Figure 13C:
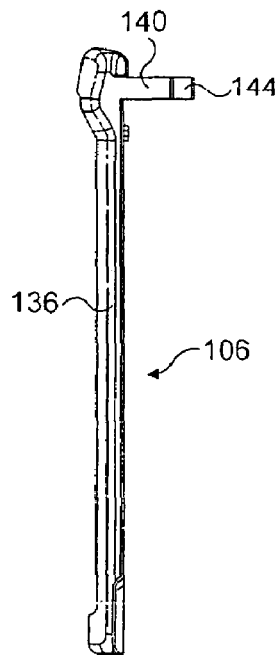
FIG. 13(c) illustrates a side view of the locking slide element of the connector of FIG. 11(a)
Figure 13D:
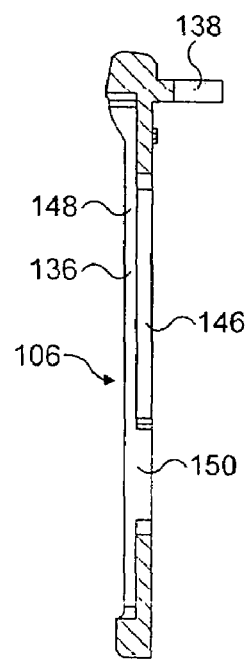
FIG. 13(d) illustrates a cross-sectional view along line X-X of FIG. 13(b)
Figure 13E:
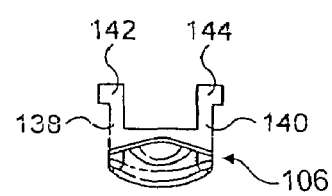
FIG. 13(e) illustrates a top view of the locking slide element of the connector of FIG. 11(a)

The locking slide element 54 comprises a body section 96, in this embodiment an elongate section, and a lateral projection 98 for engagement with respective ones of the lugs 50 of fluid-conducting components 2 to be interconnected. The body section 96 includes a through slot 100 and a recess 102 for respectively receiving the rib 70 and the flange section 68 on the support 58 of the coupling element 52. The through slot 100 includes cut-outs 106 in the opposed sides thereof which act to engage the lateral projections 74 on the rib 70 of the support 58 of the coupling element 52 to lock the locking slide element 54 in the locked position. With this configuration, the locking slide element 54 is captively slideably disposed to the coupling element 52 between a first, extended position (as illustrated in FIGS. 7 and 8), in which the projection 98 on the locking slide element 54 is extended to allow for the complete insertion of the coupling element 52 in the respective ones of the slot arrangements 18, 20 in the fluid-conducting components 2, and a second, retracted position (as illustrated in FIGS. 9 and 10), in which the projection 98 engages respective ones of the lugs 50 of the fluid-conducting components 2 to be interconnected such as to lock the coupling element 52 in position.

The operation of the connection system will now be described hereinbelow with reference to the FIGS. 7 to 10.

In a first step, connectors 4a, 4b are inserted into respective ones of the first and second slot arrangements 18, 20 of adjacent fluid-conducting components 2. The insertion of the coupling members 60, 62 of the coupling elements 52 of the connectors 4a, 4b causes the first cam surfaces 86, 88 on the flange sections 78, 80 of the coupling elements 52 to act on the respective first cam surfaces 26 of the slots 18a, 18b, 20a, 20b of each of the slot arrangements 18, 20 and thereby draw the connection faces 11 of the fluid-conducting components 2 together in alignment (translationally in the x and z axes and rotationally about the y and z axes) and provide a fluid-tight seal between the fluid ports 12, 12 therein. At the same time, the insertion of the coupling members 60, 62 of the coupling elements 52 causes the edge cam surfaces 92, 94 on the flange sections 78, 80 of the coupling members 60, 62 to act on the respective edge cam surfaces 32 of the slots 18a, 18b, 20a, 20b of each of the slot arrangements 18, 20 and thereby align the fluid-conducting components 2 (translationally in the y and z axes and rotationally about the x axis).

In a second step, the connectors 4a, 4b are locked in position by sliding the slide elements 54 to the locked position, in which position the projection 98 on each slide element 54 engages ones of the lugs 50 on the connection faces 11 of the fluid-conducting elements 2 and prevents the movement of the coupling elements 52 from the respective slot arrangements 18, 20. In this locked position, the lateral projections 74 on the rib 70 of the support member 58 of each of the coupling elements 52 engage the cut-outs 106, 106 in the through slot 100 in each of the slide elements 54 so as to maintain the slide elements 54 in the locked position.

The connection system of figures 11 to 19 comprises a plurality of fluid-conducting components 100, one of which is shown in FIGS. 14-19, and a plurality of connectors 102 for interconnecting the fluid-conducting components 100.

As illustrated in FIGS. 11(a)-13(e), the connectors 102 comprise a coupling element 104 and a locking slide element 106, which locking slide element 106 is slideably disposed on the coupling element 104.

The coupling element 104 has a structure similar to that of the coupling element 52 of the embodiment illustrated in FIG. 1-10, and comprises a support 108, first and second coupling members 110, 112, which extend in parallel, spaced relation to one another from the support 108. The support 108 comprises a base 114, a flange section 116, spaced from and extending longitudinally along the outer surface of the base section 114, and a rib 118. The rib 118 has a smaller width than the flange 116 and connects the base 114 and the flange 116. The rib 118 includes an enlarged section 120 at one end, which enlarged section acts to prevent improper fitting of the coupling element 104 and the locking slide element 106.

The first and second coupling members 110, 112 each comprise a first and second flange section 122, 124, which extend in spaced and parallel relation from the base 114 of the support 108, and a third, web section 126, which interconnects the flange sections 122, 124.

In the same way as the flange sections of the first embodiment, the flange sections 122, 124 each include a first, cam surface 128, 130, in this embodiment an inwardly-facing side surface. The first cam surfaces 128, 130 of the flange sections 122, 124 are each tapered outwardly, in this embodiment at an angle of about 2°, from the base section 114 of the support 108.

In the same way as the flange sections of the first embodiment, the flange sections 128, 130 each further include a second, cam surface 132, 134, in this embodiment an inwardly-facing edge surface. The edge cam surfaces 132, 134 of the flange sections 122, 124 are each tapered outwardly, in this embodiment at an angle of about 2°, from the base section 114 of the support 108.

The locking slide element 106 comprises a body section 136, in this embodiment an elongate section, and first and second resilient arms 138, 140 extending in a spaced, parallel relation from one end of the body section 136. The distal end of each arm 138, 140 comprises a projection 142, 144 extending substantially perpendicular of the arm 138, 140.

The body section 136 includes a through slot 146 and a recess 148 for respectively receiving the rib 118 and the flange 116 of the support 108 of the coupling element 102. The through slot 146 includes a wider section 150 to engage the enlarged section 120 on the rib 118 of the support 108.

Each fluid-conducting component 100 comprises a main body 160 and at least one connection face 162, in this second embodiment first and second connection faces 162a, 162b at opposed ends thereof, which connection faces 162a, 162b are connected to the connection faces 162a, 162b of other fluid-conducting components 100 by first and second connectors 102.

The first and second connection faces 162a, 162b each include a substantially planar connection surface 164, which surface 164 includes a fluid port 166 in fluid communication with an internal fluid conduit, and first and second recesses 168, 170 which, in this embodiment, extend along opposed sides of the main body 160, in which recesses 168, 170 the base section 114 at least of the first and second connectors 102 are housed in use.

The first and second connection faces 162a, 162b each further include first and second slot arrangements 172, 174, in this embodiment each comprising first and second elongate, parallel slots 172a, 172b, 174a, 174b which extend in opposed relation inwardly from respective ones of the first and second recesses 168, 174.

The slots 172a, 172b, 174a, 174b of the slot arrangements 172, 174 each include an elongate aperture 176 in the respective connection surface 162, in which apertures 176 a flange 122, 124 of a respective one of the connectors 102 is insertable. The slots 172a, 172b, 174a, 174b each further include a first cam surface 180, in this embodiment an inwardly-facing side surface facing oppositely from the respective connection surface 162, which tapers inwardly from the respective recess 168, 170 in a direction away from the respective connection surface 162, in this embodiment at an angle a of about 2°, with respect to the axis of insertion of the respective connector 102. The slots 172a, 172b, 174a, 174b each further include a second cam surface 182, in this embodiment an outwardly-facing base surface, which tapers outwardly from the respective recess 168, 170, in this embodiment at an angle β of about 2°, with respect to the axis of insertion of the respective connector 102.

The first and second connection faces 162a, 162b each further include a recess 184 in the connecting face 162a, 162b adjacent each slot 172a, 172b, 174a, 174b, located on the side of each respective slot that is distal the fluid port 166. The recesses 184 of the fluid-conducting components 100 and the resilient arms 138, 140 and projections 142, 144 of the connectors 102, are arranged such that when the flange sections 122, 124 of the connectors 102 are inserted into the slots 172a, 172b, 174a, 174b, the projections 142, 144 fit into the recesses 184 to lock the connector 102 in position relative to the fluid-conducting components 100.

The recess 184 comprises a tapered section 186, which tapers outwardly from the recess 184 to the respective one of the slots 172a, 172b, 174a, 174b. In use, when the locking slide element 106 is pushed downwards, the resilient arms 138, 140 are deflected inwards by the tapered section 186. Release of the projections 142, 144 from the recesses 184 unlocks the connector 102 relative to the fluid conducting components 100 allowing the connector 102 to be slid out from between the fluid-conducting components 100 and thereby disconnecting adjoining fluid-conducting components 100.

Figure 14A:
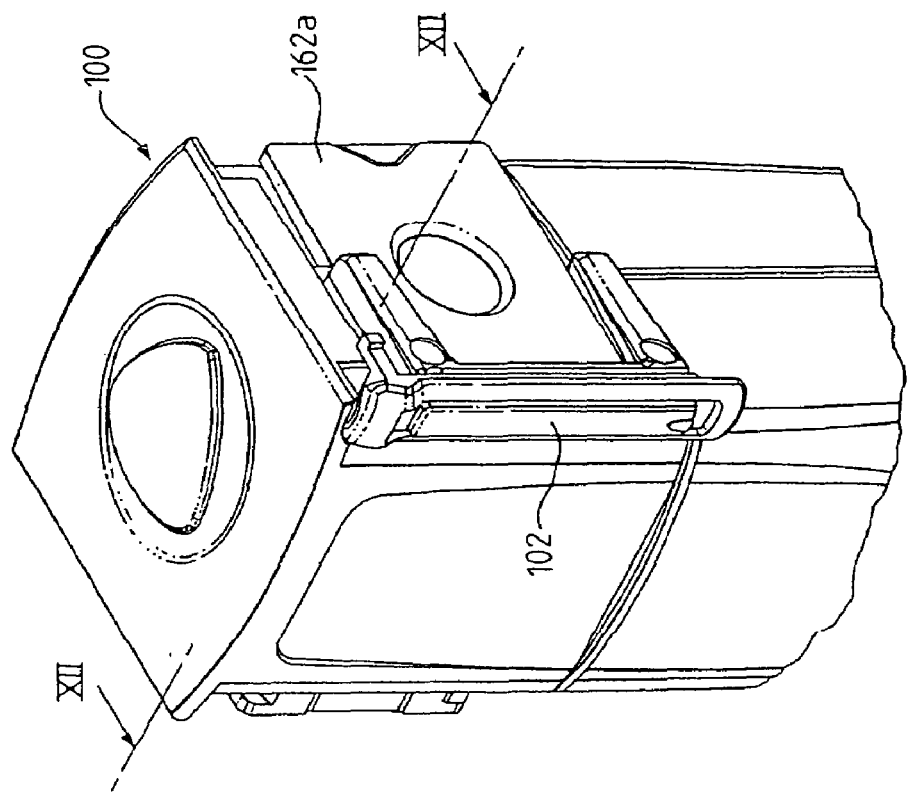
FIG. 14(a) illustrates a connector. and a fluid-conducting component according to a second embodiment of the invention.
Figure 14B:
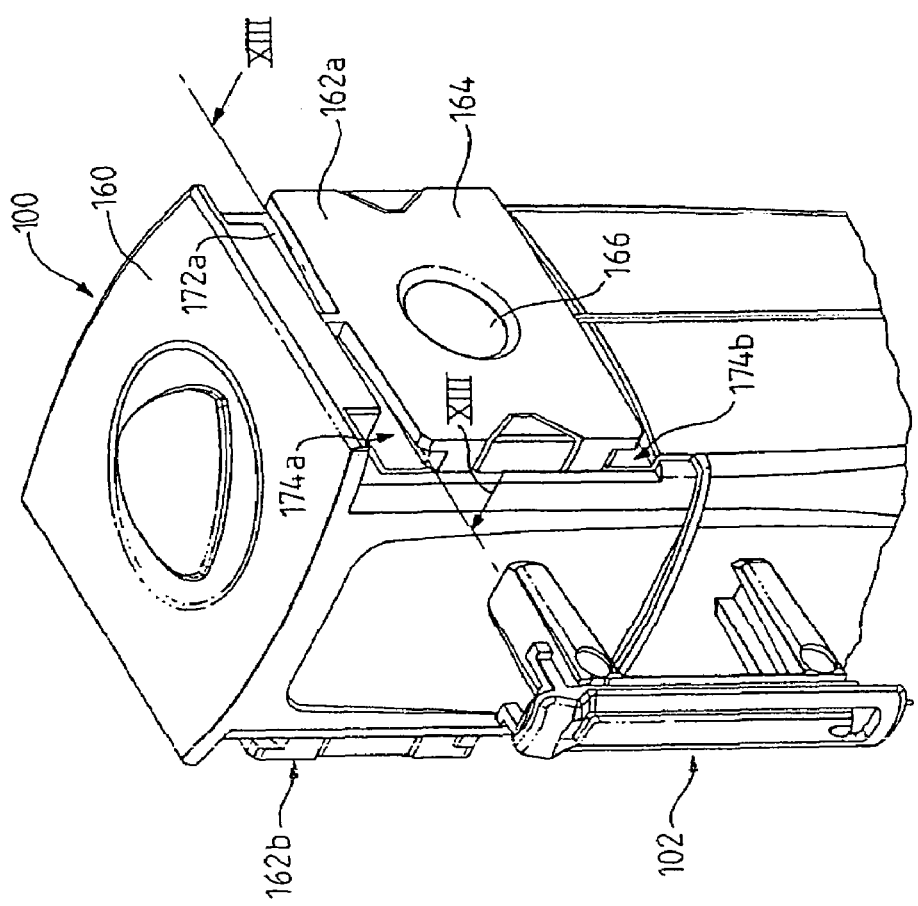
FIG. 14(b) illustrates the connector and fluid-conducting component of FIG. 14(a) with the connector arranged in a connecting position relative to the fluid-conducting component.

FIGS. 14(*a*) and 14(*b*) show a connector 102 in relation to a single fluid-conducting component 100 in order to more clearly illustrate the arrangement of the connector 102 relative to the fluid-conducting component 100. In use, two connectors 102 would be used to adjoin two facing fluid-conducting components 100, in a manner similar to that described in relation to the first embodiment.

Figure 15A:
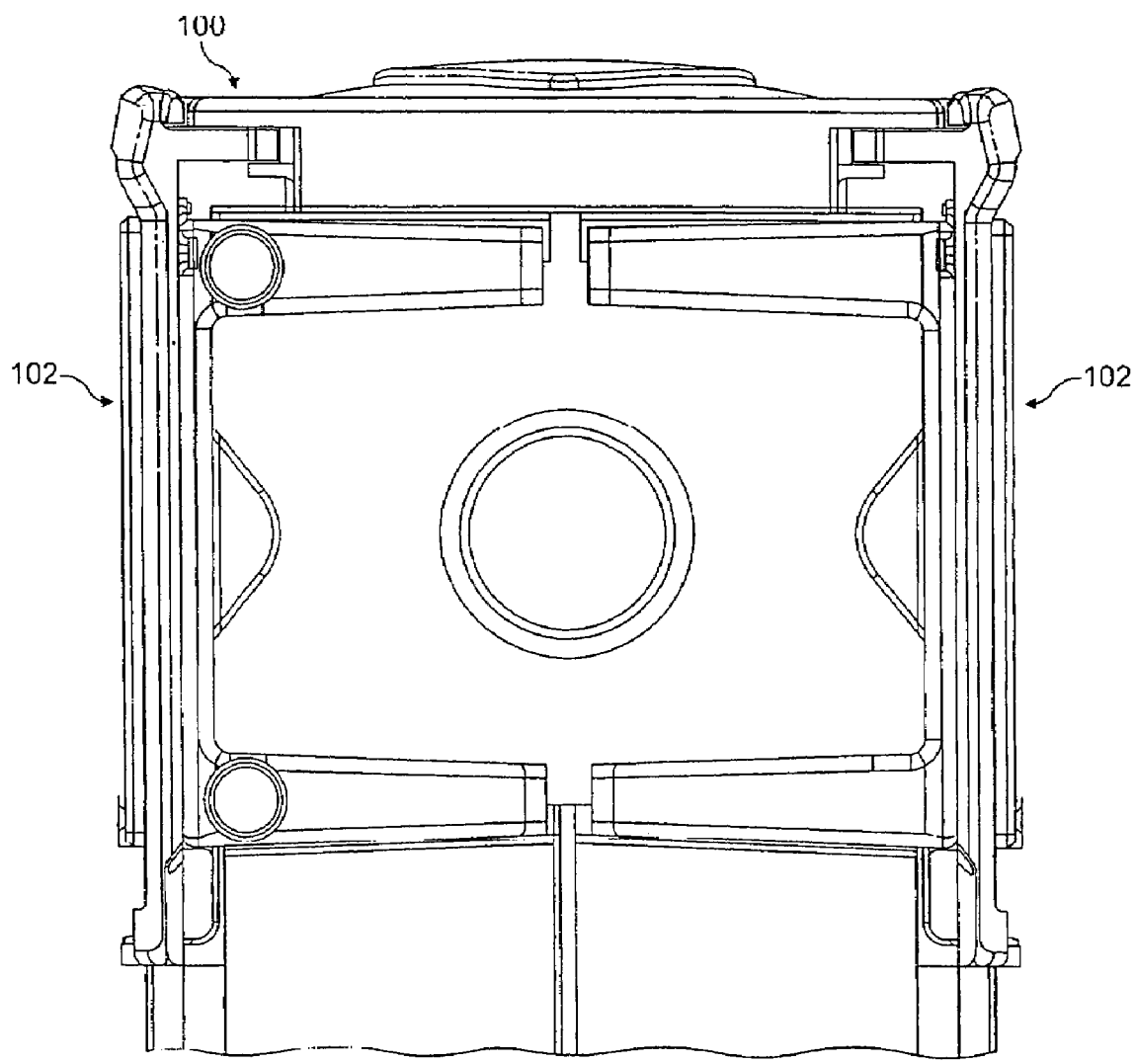
FIG. 15(a) is a side view of the arrangement of FIG. 14(b), with the connector in a locked position.
Figure 15B:
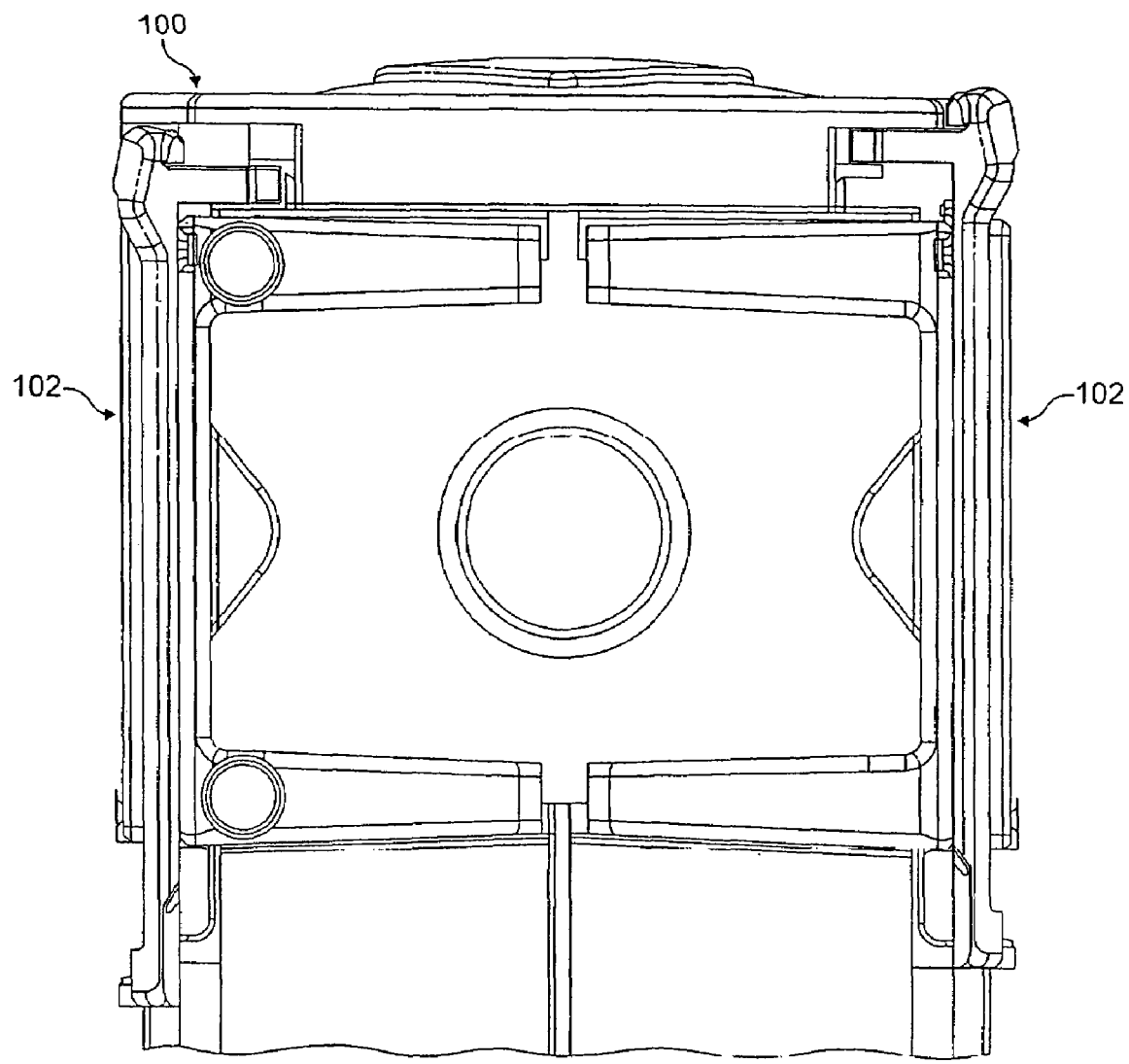
FIG. 15(b) illustrates the apparatus of FIG. 15(a) with the connector in a position for removal from the fluid-conducting component.
Figure 16:
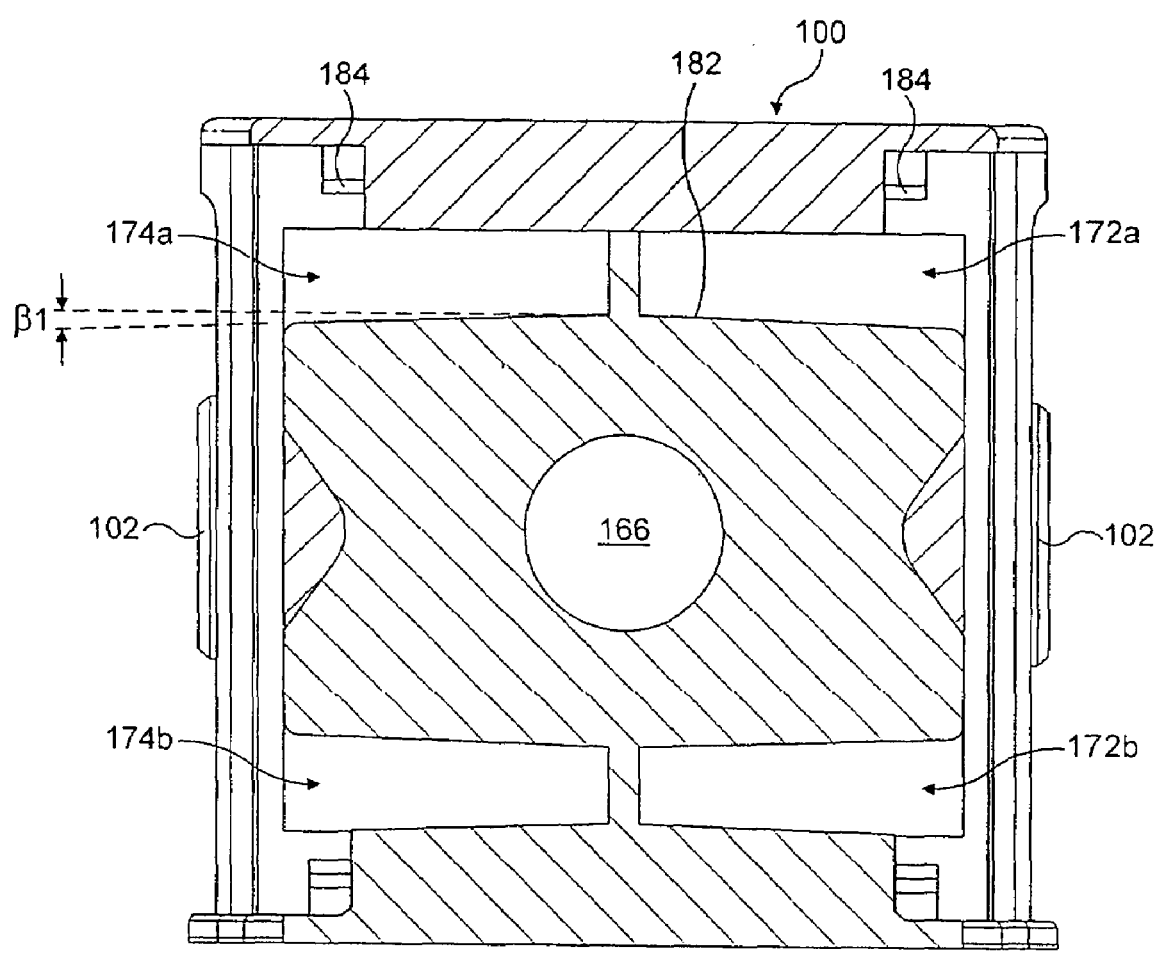
FIG. 16 illustrates a cross-sectional side view of a fluid-conducting component and two connectors arranged in the locked position.
Figure 17:
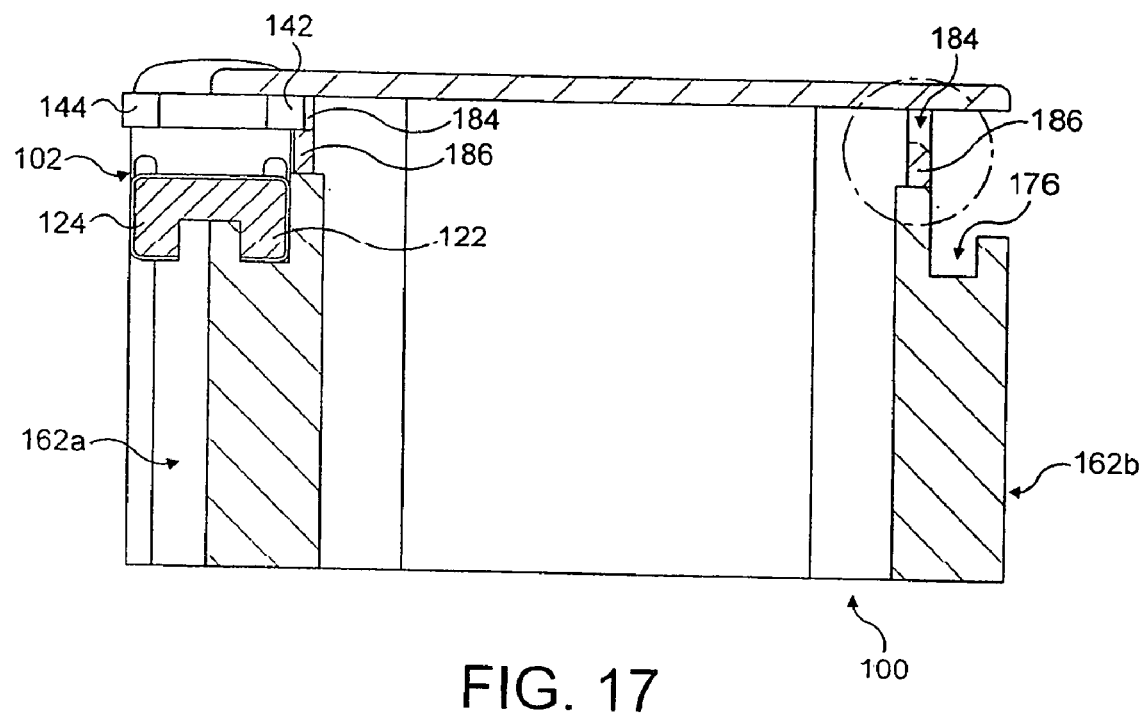
FIG. 17 illustrates a cross-sectional view along the line XII-XII of FIG. 14(b) showing the upper part of the device.
Figure 18:
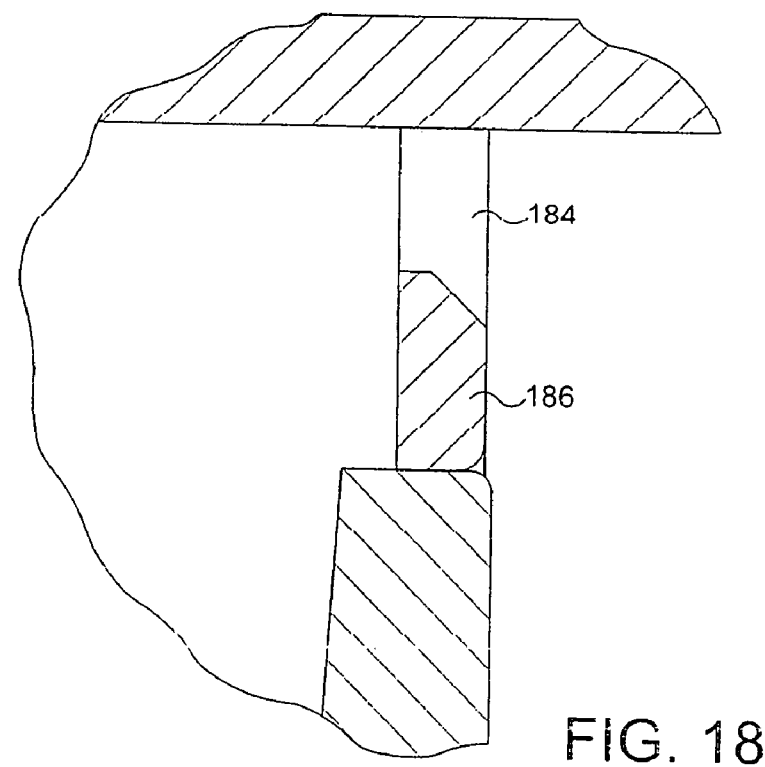
FIG. 18 is an enlarged view of the circles section of FIG. 17.
Figure 19:
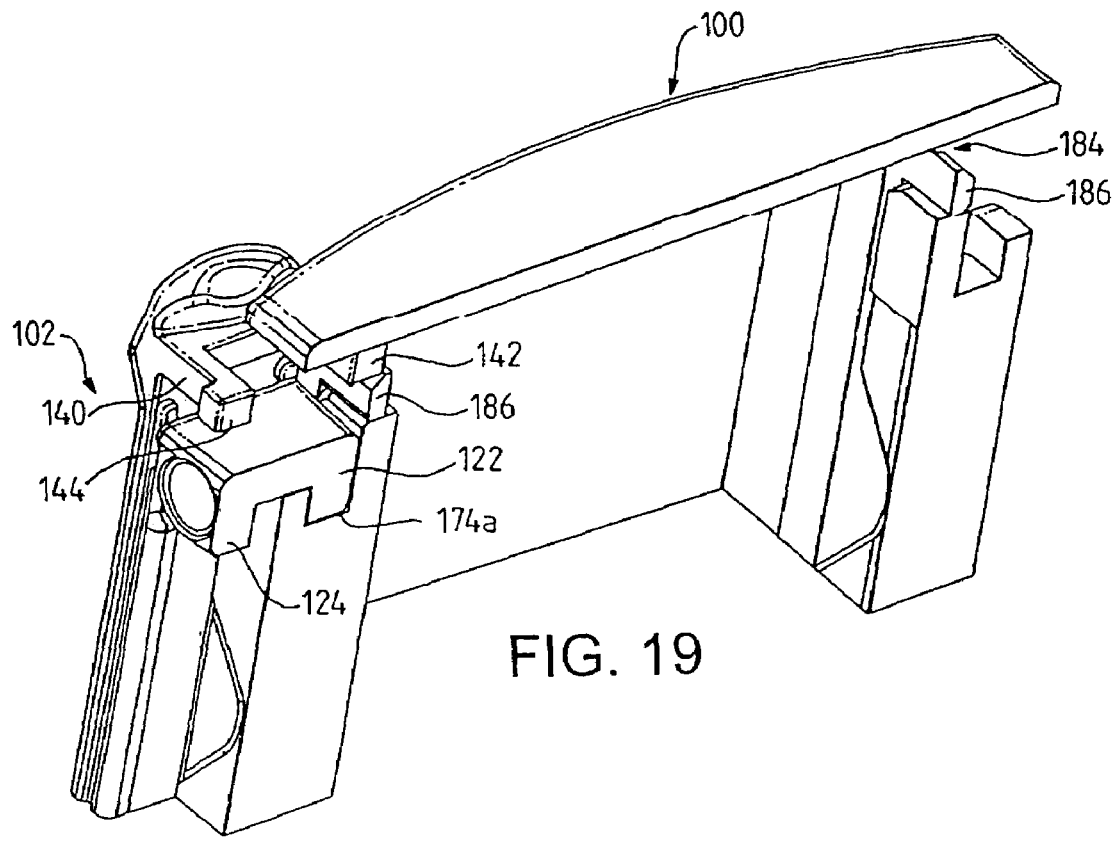
FIG. 19 is a schematic illustration of part of the connector and fluid-conducting component illustrating the relationship between the connector and the fluid-conducting component in the locked state.
Figure 20:
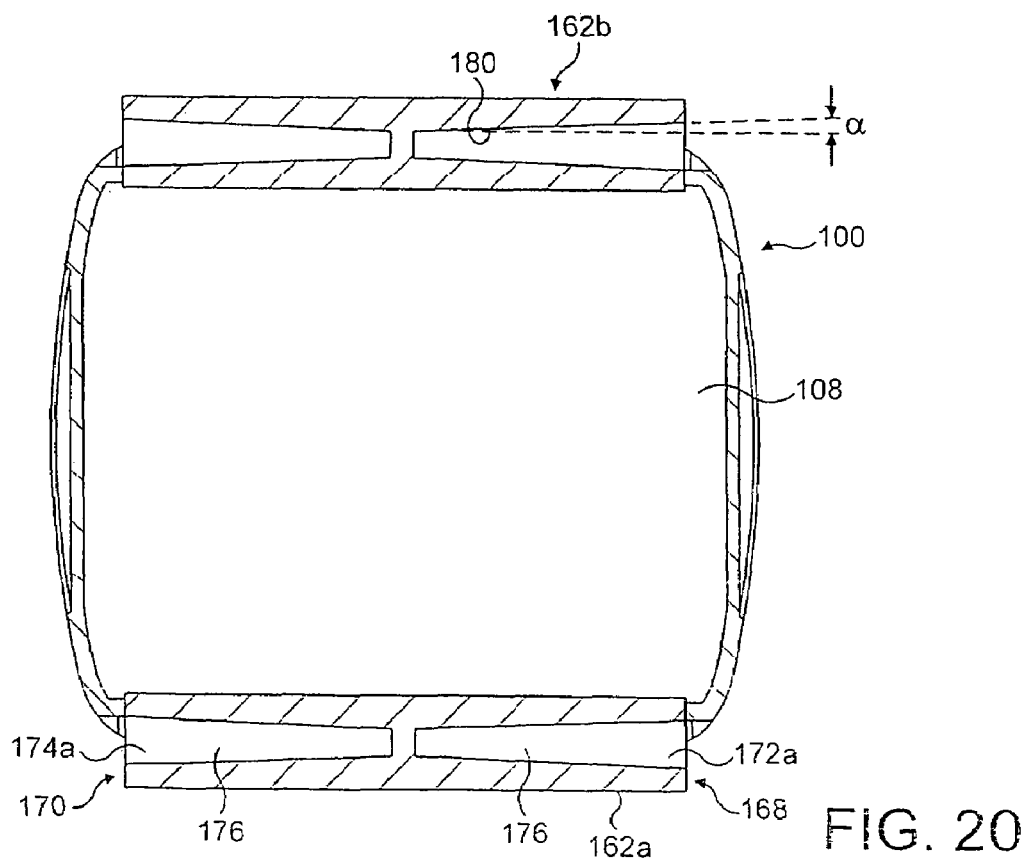
FIG. 20 is a cross-sectional view along line XIII-XIII of FIG. 14(a).

FIG. 15(*a*) shows a fluid-conducting component 100 with a connector 102 located at each side thereof, both connectors 102 being in a locked position. FIG. 15(*b*) shows the fluid-conducting component 100 of FIG. 15(*a*) with the left hand connector 102 in the unlocked position.

The operation of the connection system will now be described hereinbelow with reference to the FIGS. 14(*a*) to 20.

In a first step, connectors 102 are inserted into respective ones of the first and second slot arrangements 172a, 172b, 174a, 174b of adjacent fluid-conducting components 100. The insertion of the coupling members 110, 112 of the coupling elements 104 of the connectors 102 causes the first cam surfaces 128, 130 on the flange sections 122, 124 of the coupling elements 104 to act on the respective first cam surfaces. 180 of the slots 172a, 172b, 174a, 174b, and thereby draw the connection faces 162 of the fluid-conducting components 100 together in alignment (translationally in the x and z axes and rotationally about the y and z axes) and provide a fluid-tight seal between the fluid ports 166, 166 therein. At the same time, the insertion of the coupling members 128, 130 of the coupling elements 104 causes the edge cam surfaces 132, 134 on the flange .sections 122, 124 of the coupling members 110,112 to act on the respective edge cam surfaces 182 of the slots 172a, 172b, 174a, 174b and thereby align the fluid-conducting components 100 (translationally in the y and z axes and rotationally about the x axis).

Upon insertion of the flange sections 122, 124 of the coupling members 110, 112 into the respective slots 172a, 172b, 174a, 174b, the projections 142, 144 on the resilient arms 138, 140 fit into the recesses 184 in the connecting faces 162 and the connectors 102 lock the adjacent fluid-conducting components 100 together.

In a second step, the connectors 102 are unlocked by sliding the slide elements 106 downwards from the locked position to the unlocked position, in which unlocked position the projection 142, 144 on each resilient arm 138, 140 is deflected away from the recess 184 by means of the tapered section 186. Release of the projections 142, 144 from the respective recess 184 allows movement of the coupling elements 104 from the respective slot arrangements 172, 174.

Finally, it will be understood that the present invention has been described in its preferred embodiments and can be modified in many different ways without departing from the scope of the invention as defined by the appended claims.

The invention claimed is:

1. A connection system comprising first and second fluid-conducting components and at least one connector, each of the first and second fluid-conducting components comprising a slot arrangement comprising first and second substantially parallel slots extending across a connection face of the fluid-conducting component from an edge of the connection face, each of the first and second slots having a first tapered surface and a second tapered surface, the at least one connector comprising a coupling element having first and second coupling members, each of the coupling members having a first tapered surface and a second tapered surface, wherein, in use, the at least one connector engages with the slot arrangement such that the first tapered surface of the first and second slots engages with the first tapered surface of the respective first and second coupling member, to draw the first and second fluid-conducting components together, and the second tapered surface of the first and second slots engages with the second tapered surface of the respective first and second coupling member to align the first fluid-conducting component relative to the second fluid-conducting component.

2. A connection system according to claim 1, wherein the first and second slots respectively define a first and second channel in the fluid-conducting component.

3. A connection system according to claim 2, wherein the first tapered surface of the first and second slots comprises one or both walls of the respective first or second channel that are substantially parallel to the connection face of the fluid-conducting component.

4. A connection system according to claim 3, wherein the first tapered surface of the first and second slots tapers inwards along the length of the slot, such that the width of the channel provided by the slot converges from the edge of the connection face towards the distal end of the slot.

5. A connection system according to claim 1, wherein the second tapered surface of the first and second slots comprises one or both of the edges defining the slot.

6. A connection system according to claim 5, wherein the edges taper inwardly along the length of the slot, such that slot converges from the edge of the connection face towards the distal end of the slot.

7. A connection system according to claim 1, wherein the coupling element of the connector comprises a support from which the first and second coupling members extend.

8. A connection system according to claim 7, wherein the first and second coupling members extend substantially perpendicular of a first side of the support and are spaced apart from one another on the support.

9. A connection system according to claim 8, wherein the first and second coupling members are located substantially at opposite ends of the support.

10. A connection system according to claim 7, wherein the connector further comprises a slide element, which is slideably disposed relative to the support between an unlocked position and a locked position.

11. A connection system according to claim 10, wherein one or both of the first and second fluid-conducting components comprise a lug which is engaged, in use, by a projection of the slide element of the connector when in the locked position.

12. A connection system according to claim 10, wherein both of the fluid conducting components comprise a recess to receive a projection on the slide element, arranged such that when said projection is received in said recess said slide member is in a locked position.

13. A connection system according to claim 12, wherein the recess comprises a tapered section, which tapered section tapers outwardly from the recess to a slot of the fluid conducting component, the tapered section being used to deflect the projection out of engagement with the recess and thereby place the slide element in the unlocked position.

14. A connection system according to claim 10, wherein the slide element comprises a body section including a recess in which the rib of the support is captively disposed.

15. A connection system according to claim 7, wherein the support comprises a base section and a rib, which extends longitudinally along the base.

16. A connection system according to claim 1, wherein the first and second coupling members have a substantially U-shaped cross-sectional shape, each comprising first and second side walls joined by a bridging wall.

17. A connection system according to claim 16, wherein the first coupling member and the second coupling member are arranged such that longitudinal edges of the side walls of the first coupling member face longitudinal edges of the side walls of the second coupling member.

18. A connection system according to claim 17, wherein the first tapered surface of each of the first and second coupling members is provided by the inner surface of one or both of the side walls of the coupling member, wherein the thickness of the side walls decreases from the support to the distal end of the coupling member.

19. A connection system according to claim 16, wherein the first tapered surface of each of the first and second coupling members is provided by the inner surface of one or both of the side walls of the coupling member, wherein the thickness of the side walls decreases from the support to the distal end of the coupling member.

20. A connection system according to claim 17, wherein the second tapered surface of the first and second coupling members is provided by the longitudinal edges of the side walls of the first and second coupling members, wherein the longitudinal edges diverge outwards from the support such that the depth of the side walls decreases from the support to the distal end thereof.

21. A connection system according to claim 18, wherein the second tapered surface of the first and second coupling members is provided by the longitudinal edges of the side walls of the first and second coupling members, wherein the longitudinal edges diverge outwards from the support such that the depth of the side walls decreases from the support to the distal end thereof.

22. A connection system according to claim 1, wherein the connection face of each fluid-conducting component includes a fluid port.

23. A connection system according to claim 1, wherein the fluid-conducting components each comprises a recess extending along part or substantially the whole of the edge of the connection face from which the first and second slots extend.

24. A connection system according to claim 1, wherein the first tapered surface of the first and second slots tapers at an angle of about 2°.

25. A connection system according to claim 1, wherein the second tapered surface of the first and second slots tapers at an angle of about 2°.

26. A connection system according to claim 1, wherein the first tapered surface of the first and second coupling members tapers at an angle of about 2°.

27. A connection system according to claim 1, wherein the second tapered surface of the first and second coupling members tapers at an angle of about 2°.

28. A connection system according to claim 1, wherein the connection face of each of the fluid-conducting components is substantially planar.

29. A connection system according to claim 1, wherein the connection faces of the first and second fluid-conducting components each comprises first and second slot arrangements extending in opposed relation from opposing edges of the connection face.

30. A connection system according to claim 29, comprising first and second connectors.

31. A connection system as in claim 1, further including a support interconnecting the first and second coupling members of each coupling element, wherein the first and second coupling members each comprise elongated members spaced apart at opposite distal ends of the support, and each coupling member includes i) a pair of inwardly and oppositely-facing tapered side surfaces comprising the first tapered surface; and ii) a pair of outwardly-tapered edge surfaces, facing a pair of respective edge surfaces from the other coupling member, comprising the second tapered surface.

* * * * *